Figure 1:
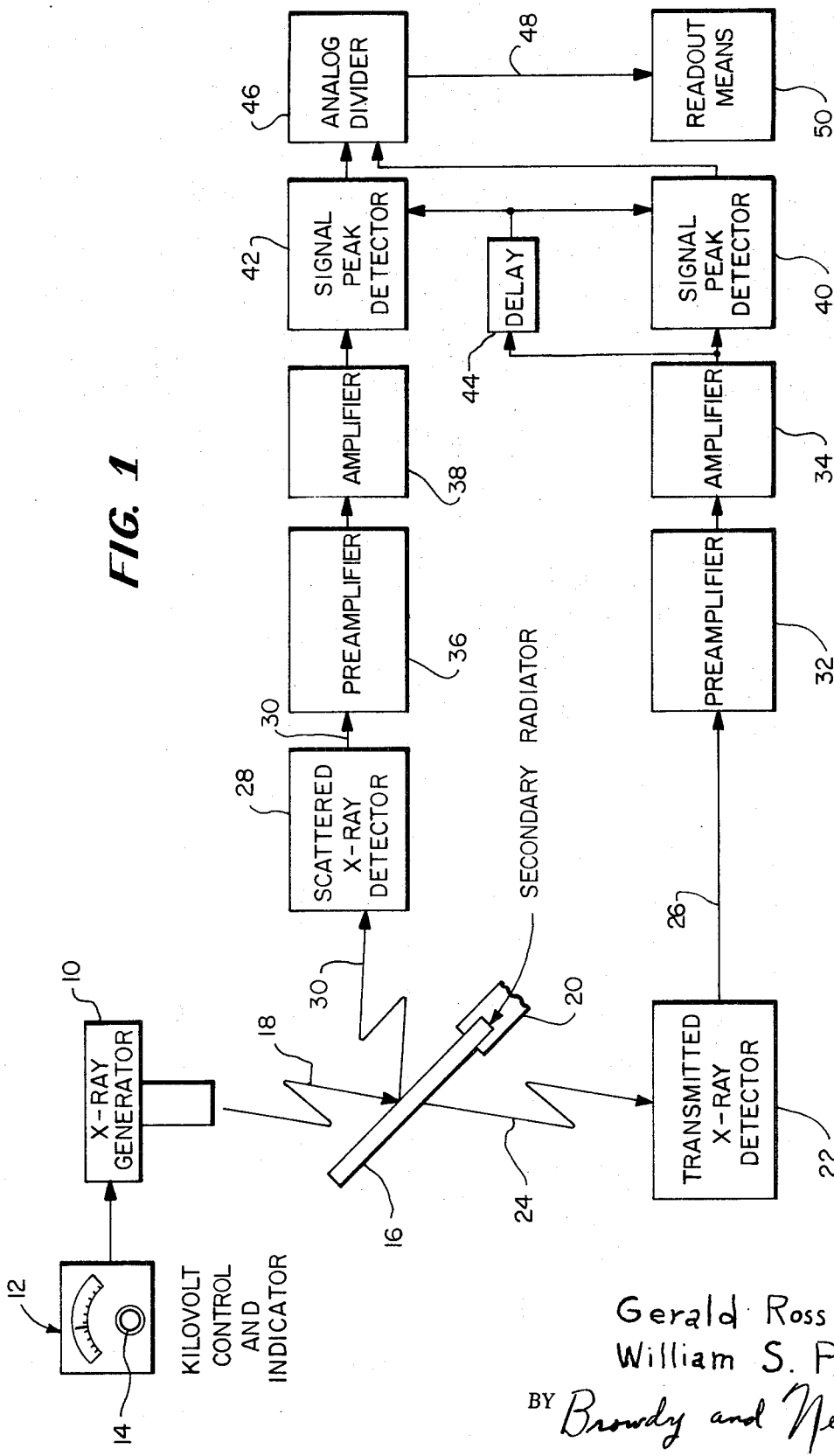

United States Patent [19]

Harris et al.

[11] 3,766,383
[45] Oct. 16, 1973

[54] TECHNIQUES AND APPARATUS FOR CALIBRATING THE KILOVOLTAGE INDICATOR ON DIAGNOSTIC X-RAY GENERATORS

[75] Inventors: Gerald R. Harris; William S. Properzio, both of Rockville, Md.

[73] Assignee: The United States of America as represented by the Secretary of the Department of Health, Education, and Welfare, Washington, D.C.

[22] Filed: Nov. 26, 1971

[21] Appl. No.: 202,439

[52] U.S. Cl. .............................................. 250/51.5
[51] Int. Cl. ........................................... G01n 23/20
[58] Field of Search .................................... 250/51.5

[56] References Cited
UNITED STATES PATENTS

| | | | |
|---|---|---|---|
| 2,977,478 | 3/1961 | Wuppermann | 250/51.5 X |
| 3,433,954 | 3/1969 | Bowman et al. | 250/51.5 X |
| 3,100,261 | 8/1963 | Bigelow | 250/51.5 |

OTHER PUBLICATIONS

X-Ray Diffraction Procedures by H. P. Klug et al., Published by John Wiley & Sons, Inc., New York, 1954, pages 80 & 81.
X-Ray X-Rays, Fourth Edition, by G. L. Clark, Published by McGraw-Hill Book Co., Inc., New York, 1955, page 61. QC 481 C 47.

Primary Examiner—William F. Lindquist
Attorney—Browdy & Neimark

[57] ABSTRACT

A novel apparatus for calibrating the kilovoltage indicator on diagnostic x-ray generators is disclosed. A flat sheet element having a known K-edge absorption energy value is placed in the irradiating path of x-rays produced by the diagnostic x-ray generator, the element preferably being disposed at an angle of 45° to the generated radiation path. As the energy of the generated x-rays is increased, the amount or radiation scattered from the element is detected by a detector means preferably disposed at an angle of substantially 90° to the generated x-ray beam and in line with the center of the element. Similarly, the amount of radiation transmitted through the element is detected by detector means preferably disposed in the path of the x-ray beam and immediately below the element. The ratio between the transmitted and scattered detected radiation values is monitored and a change in slope sign of the monitored ratio is determined. Such change in slope sign occurs at the known K-absorption edge value of the irradiated element and by noting the reading on the kilovoltage indicator of the diagnostic x-ray generator at this point, calibration of such meter can be effected.

9 Claims, 3 Drawing Figures

TECHNIQUES AND APPARATUS FOR CALIBRATING THE KILOVOLTAGE INDICATOR ON DIAGNOSTIC X-RAY GENERATORS

This invention generally relates to x-ray devices and particularly concerns an apparatus for calibrating the kilovoltage indicator on diagnostic x-ray generators.

As is known, conventional diagnostic x-ray generators have associated therewith a kilovoltage meter which indicates the selected energy value of the x-radiation generated. For purposes of medical safety as well as therapeutic accuracy, it is important to insure that such kilovoltage meter is accurately calibrated such that the actual energy value of the x-radiation generated by the machine corresponds virtually identically to the meter reading value. Of course, for such a calibration to be effected, a highly accurate reference standard must initially be provided.

The instant invention contemplates to utilize, as the reference standard, the K-absorption edge energy of any known element.

From an atomic structure point of view, the energy value of the K-absorption edge of an element is the amount of energy required to remove or excite a 1s electron to the lowest unoccupied quantum state within the atom. the 1s state, in x-ray terminology corresponds to the K quantum shell, and this energy value, for any given element, is statistically and empirically known. One manner by which an electron can be removed from the K-shell is by the so-called x-ray photoelectric effect. If x-ray photons having a sufficiently high energy are incident upon an atom, an electron can be ejected from the K-shell and the threshold photon energy necessary for this process is known as the K-edge energy value.

As is known, the attenuation of a beam of x-rays passing through matter occurs primarily by means of this photoelectric absorption process since each incidence or act of absorption serves to remove a photon from the incoming x-ray beam. An expression for the intensity I of x-rays transmitted through a slab of matter having a thickness x is as follows:

$$I = I_0 e^{-Ax}$$

where $I_0$ is the intensity of energy incident on the slab of matter. This particular expression defines the aborption coefficient of the particular slab of matter.

Figure 2:
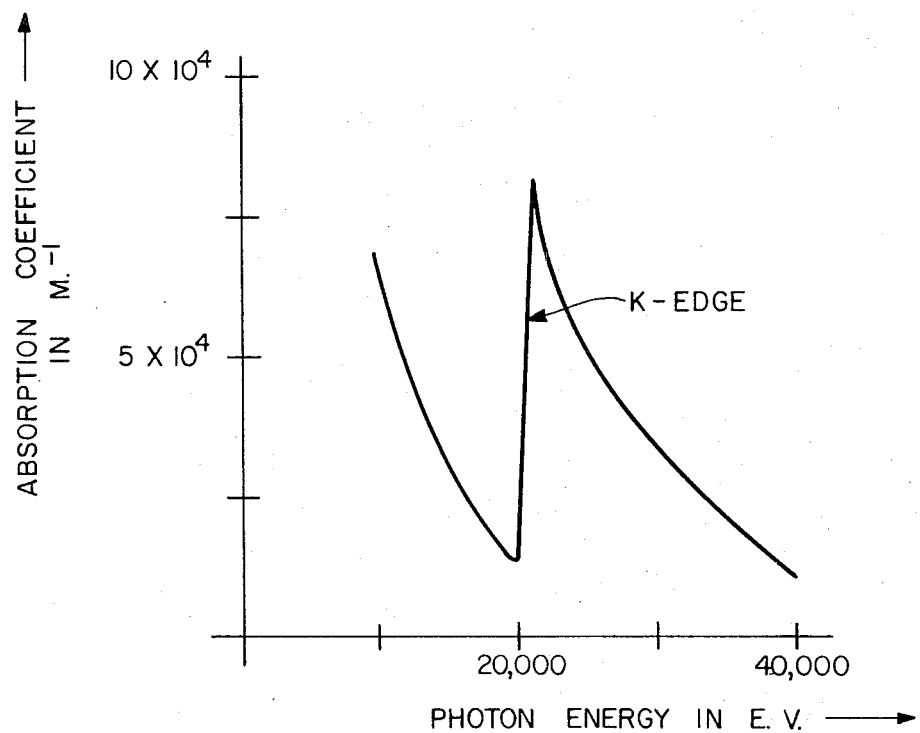

Referring at this point to FIG. 2 of the appended drawings, a typical schematic illustration or plot of the absorption coefficient for x-rays in solid molybdenum as a function of the incident x-ray photon energy is depicted. As illustrated, the absorption coefficient generally decreases with increasing photon energy of and incident x-radiation. However, the absorption of x-rays will be seen to increase sharply as the incident photon energy increases beyond a certain threshold, this threshold defining the minimum energy for K-excitation of the element and being known as the so-called K-absorption edge. Since the value of the K-absorption edge of the various elements is known, one need only detect the occurence of K-excitation in a given test element, for example, and one therefore would have an indication of the value of incident x-ray energy thereupon. By correlating this calculated and known value with the particular value read off the kilovoltage indicating meter of the x-ray generating machine, a calibration of such meter can thereby be readily effected. The instant invention utilizes this principle and further takes advantage of the fact that when an element is irradiated with x-rays, K-series fluorescence or scattered radiation will be produced if the peak energy of the x-ray beam is greater than the K-absorption edge of the particular element being irradiated and the instant inventive apparatus is utilized to determine the particular kilovoltage setting of the diagnostic x-ray generating machine at which such K-fluorescence radiation first appears.

In this respect, the novel invention contemplates to place an element, preferably in the form of a flat slab, in the path of x-radiation generated by the diagnostic machine such that the element will be irradiated thereby. The standard or reference element is placed at an acute angle to the incoming beam and, in the disclosed embodiment, such angle is contemplated to comprise 45°. The amount of radiation transmitted through the standard or reference element is detected as is the amount of radiation scattered from the element by detector means respectively located below the reference element in line with the x-ray beam, and to the side of the reference element at an angle of 90° to the x-ray beam in line with the center of the reference element itself.

The ratio of the detected transmitted versus scatter radiation from the element is then monitored. As the energy of the incident radiation approaches the K-absorption edge of the irradiated element, this ratio will increase since more radiation will be transmitted through the element than will be scattered therefrom. However, as the K-absorption edge of the element is reached and exceeded, the sign of the monitored ratio will reverse as more radiation will be scattered than transmitted through the reference element.

By noting the kilovoltage meter reading value of the diagotic x-ray generator at the time when the change in sign of monitored detector ratio slope occurs, and by comparing the noted meter reading with the known value of the K-absorption edge of the reference element, an accurate calibration of the kilovoltage meter is effected.

The apparatus provided by the instant invention so as to achieve such calibration is relatively simple in construction and is contemplated to comprise a portable instrument for calibrating many different diagnostic x-ray generators. As will be explained hereinbelow, operation and set-up of the novel inventive device can readily be effected making the instant inventive device highly convenient and practical to use.

Figure 3:
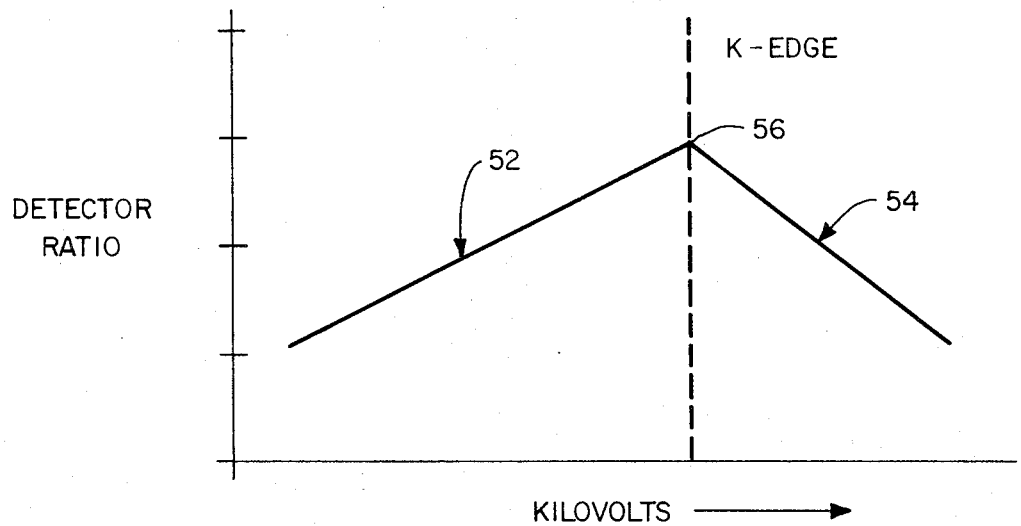

The invention will be better understood, its operation and advantageous features more readily appreciated, from the following detailed description of a preferred structural embodiment, such description making reference to the appended sheets of drawing wherein:

FIG. 1 is a schematic block-diagram illustration of the overall calibration system of the instant invention;

FIG. 2 is a schematic diagram, as already discussed at the outset to this specification, of the absorption coefficient and the occurence of the K-absorption edge in a typical element; and FIG. 3 is a diagrammatic illustration of a plot of the monitored detector ratios between a means serving to detect transmitted radiation through a reference element as compared with scattered radiation through such element at increasing energy values of incident radiation.

Referring to FIG. 1 of the drawings, the overall inventive system is depicted and will be seen to be utilized with a standard diagnostic x-ray generator indicated by reference numeral 10. The x-ray generator has, in known fashion, a kilovoltage control generally designated 12 by which the energy of the radiation emitted from the X-ray generator 10 can be selected. The kilovoltage control 12 further includes a kilovoltage indicator or meter 14 indicating the setting of the desired radiation to be generated by the x-ray generator 10. The instant invention, as aforestated, concerns itself primarily with the calibration of the kilovoltage meter 14 of the diagnostic x-ray machine.

To this end, a preferably flat slab of any given element 16 is disposed in the path of the incident radiation 18 from the x-ray generator 10 at an acute angle thereto by a schematically depicted holding means 20. In the preferred inventive embodiment, such acute angle is 45° to the incoming radiation beam 18.

Disposed beneath the test sample or slab 16 is a first detector means 22 serving to detect the amount of x-radiation 24 trnsmitted through the element 16, the detector means 22 producing a first electrical signal 26 in response thereto. A second detector means 28 is disposed to the side of the test or reference element 16 and preferably at an angle of 90° to the incoming radiation beam 18 and in line with the center of element 16. The second detector means 28 serves to detect the scattered x-radiation or, more specifically, the K-series fluorescence radiation 30 emanating from the reference sample 16, the second detector 28 producing a second electrical signal 30 in response to this detected value. For convenience in operation and set-up, the positions of the detectors are relatively fixed and aligned and the detectors are internally shielded such that beam collimation of the radiation is not necessary. In the preferred inventive embodiment, detectors are contemplated to comprise lithium drifted silicon radiation detectors.

The output 26 and 30 of the detector means are then fed through respective preamplifier and amplifier devices 32, 34, and 36, 38. The amplified signal from the first and second detectors 22 and 28 are then fed to signal peak detectors 40 and 42, respectively, wherein the highest value of the signals so produced are obtained. Since, as aforestated, the instant invention preferably concerns itself with the ratio of the signals obtained from the first detector means 22 as compared with the signal obtained from the second detector means 28, a delay means 44 is provided to disable the peak detector until the radiation pulse height becomes stable; this is done because the first few pulses may be erratic and detection of the peak signal from these pulses would give erroneous results.

The outputs from the signal peak detector 40 and the signal peak detector 42 are then fed to an analogue divider means 46 wherein a third signal 48 is generated representative of the ratio between the first signal 26 and the second signal 30 or, more generally, the ratio between the detected transmitted x-radiation as compared with the detected scattered x-radiation from the reference sample 16. The ratio or third signal 48 is then monitored and displayed in a readout means 50, readout means 50 being contemplated to comprise either a D.C. meter, a graphical recorder or the like.

Referring now to FIG. 3, a plot of the values monitored by the readout means 50 is illustrated through a normal operational sequence of the novel inventive system. Initially, and at a setting of the kilovoltage control means 14 of the x-ray generator 10 below the value of the K-absorption edge of the reference sample 16, detector means 22 will detect a greater amount of radiation transmitted through the element 16 than the amount of radiation scattered from element 16 as detected by detector means 28. The ratio between the first and second signals will therefore have a positive or increasing slope if plotted against increasing kilovoltage energy of the radiation generated by the x-ray generator 10. This particular portion of the detector ratio curve is generally designated by reference numeral 52 on the plot of the curve in FIG. 3.

As the kilovoltage energy of the irradiating x-ray beam increases, the K-absorption edge of the reference or sample element 16 is reached. At this point, detector means 28 serves to detect a greater amount of scattered or fluorescent radiation than does detector means 22 and, as such, the second signal 30 would tend to be increasing at a greater rate than the first signal 26 as kilovoltage of the incoming x-ray energy further increases. The plot of the detector ratio therefore would have a negative slope such as indicated at reference numeral 54 of FIG. 3. In accordance with the principles as explained above, the point at which the slope of the detector ratio changes sign, this point being represented by reference numeral 56, serves to define the K-absorption edge value of the reference element 16. For purposes of calibration, one need merely check the kilovolt indicator 14 of the diagnostic x-ray generator 10 at this point so as to note whether the indicator or meter reads a value equal to the known K-absorption edge value of the element 16 being irradiated. If the meter reading and the known K-absorption edge value corresponds to one another, calibration of the diagnostic x-ray generator meter is assured. Further, and assuming that the kilovoltage meter 14 of the diagnostic x-ray generator 10 has already been calibrated, the principles of the instant invention can readily be applied to detect the K-absorption edge value of an unknown irradiated element consistent with the objectives of the instant invention.

As should now be apparent, the primary object initially set forth at the outset to this specification has been achieved as applicant has provided a novel device which readily can calibrate the kilovoltage indicators on diagnostic x-ray generators. Accordingly,

What is claimed is:

1. An x-ray device comprising:
   means for generating and irradiating a chemical element with x-rays,
   means for varying the energy of the generated x-rays;
   first detector means for detecting the amount of radiation transmitted through the element and for producing a first signal in response thereto;
   second detector means for detecting the amount of radiation scattered from the element and for producing a second signal in response thereto;
   means for generating a third signal representative of the ratio between the first and second signals; and
   means for monitoring the third signal and detecting relative increases and decreases thereof as the energy of the irradiating x-radiation is varied,
   whereby a change in slope of the monitored third signal as the energy of the irradiating x-radiation is varied serves to indicate the K-absorption edge of the element.

2. A device as defined in claim 1, wherein the irradiated element has a known K-absorption edge value, and wherein the energy of the irradiating x-radiation is controllable and is indicated on an indicator means, said device permitting a comparison of the indicated energy of the generated x-radiation at the point of slope change in the third signal with the known value of the K-absorption edge of the irradiated element to thereby calibrate said indicator means.

3. A device as defined in claim 1, wherein the element is in the form of a flat sheet and wherein the device includes means for holding the element beneath the x-ray generator at a fixed acute angle to and in the path of the generated radiation, said first detector means being fixedly disposed beneath the element in the path of the generated radiation, and the second detector means being fixedly disposed at substantially right angles to the path of the generated radiation and to the side of the element.

4. A device as claimed in claim 3, wherein said fixed acute angle is 45°, and wherein said second detector means is aligned with the center of the element and to the side thereof at substantially right angles to the path of radiation.

5. A device as defined in claim 4, wherein said first and second detector means comprise aligned and internally shielded radiation detectors.

6. A device as defined in claim 5, wherein said detector means are lithium drifted silicon radiation detectors.

7. A device as defined in claim 5, wherein said means for generating a third signal comprises an analogue divider into which said first and second signals are fed.

8. An apparatus for detecting proper calibration of a meter indicating the selected energy value of radiation generated by a controllable diagnostic x-ray generator, said apparatus comprising:
means for disposing a chemcial element having a known K-absorption edge energy value in the path of the generated x-radiation and at a substantially 45° angle thereto;
means of a plurality of radiation detector means for detecting radiation impinging thereon and generating an output signal in response thereto, one detector means being disposed in the path of the generated x-radiation beneath the element for detecting X-radiation transmitted through the element, the other detector means being disposed at an angle of substantially 90° to the generated x-radiation in line with the center of the element for detecting x-radiation scattered by the element; means for monitoring the ratio of the output of said one detector means to the output of the other detector means as the kilovoltage energy generated by the x-ray generator is increased; whereby a change in slope on the monitored ratio occurs at the known absorption energy value of the element and whereby the meter for indicating the selected energy of radiation indicates this known energy value if the meter is properly calibrated.

9. A method of determining calibration of a kilovoltage meter on a diagnostic x-ray generator indicating the selected energy value of radiation emitted by the generator, said method comprising the steps of:
placing an element having known K-edge absorption energy value in the path of the generated radiation and disposing the element at a 45° angle to the generated radiation path;
detecting the amount of radiation passing through the element;
detecting the amount of radiation scattered from the element;
monitoring the ratio of said detected amounts of radiation while increasing the selected kilovoltage energy of the x-ray generator;
detecting a peak of the monitored ratio and the value of the kilovoltage energy of the x-ray generator at which the peak occurs as indicated by the kilovoltage meter on the diagnostic x-ray generator; and
comparing the indicated kilovoltage meter reading with the known value of the K-absorption edge energy for the element to determine meter calibration.

* * * * *